United States Patent
Segond et al.

(10) Patent No.: US 6,405,162 B1
(45) Date of Patent: Jun. 11, 2002

(54) TYPE-BASED SELECTION OF RULES FOR SEMANTICALLY DISAMBIGUATING WORDS

(75) Inventors: Frédérique Segond; Caroline Brun, both of Grenoble (FR)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/401,685

(22) Filed: Sep. 23, 1999

(51) Int. Cl.$^7$ .............................................. G06F 17/27
(52) U.S. Cl. ........................................................ 704/9
(58) Field of Search ................... 704/1, 9, 10; 707/530, 707/531, 532, 5, 6

(56) References Cited

U.S. PATENT DOCUMENTS

| | | | | |
|---|---|---|---|---|
| 4,868,750 A | * | 9/1989 | Kucera et al. ................. | 704/10 |
| 5,243,520 A | * | 9/1993 | Jacobs et al. .................. | 704/9 |
| 5,325,298 A | * | 6/1994 | Gallant ........................... | 704/9 |
| 5,541,836 A | * | 7/1996 | Church et al. ................. | 704/9 |
| 5,642,522 A | | 6/1997 | Zaenen et al. ................. | 704/10 |
| 5,675,819 A | * | 10/1997 | Schuetze ........................ | 704/9 |
| 6,006,221 A | * | 12/1999 | Liddy et al. .................... | 707/5 |
| 6,076,088 A | * | 6/2000 | Paik et al. ...................... | 707/5 |
| 6,078,878 A | * | 6/2000 | Dolan ............................ | 704/9 |
| 6,098,033 A | * | 8/2000 | Richardson et al. ........... | 704/1 |

OTHER PUBLICATIONS

Atkins, Beryl T.S. "Tools for Computer–Aided Corpus Lexicography: the Hector Project," Acta Linguistica Hungarica, Budapest, vol. 41, 1992–93, pp. 5–71.

Brill, E. et al."Unsupervised Learning of Disambiguation Rules for Part of Speech Tagging," Natural Language Processing Using Very Large Corpora, Kluwer Academic Publishers, 1999, pp. 27–42.

Dini, Luca, et al. "Error Driven Word Sense Disambiguation," In Proceeding of Coling/ACL 1998, Montreal, Canada, pp. 320–324.

"Ginger II: An Example–Driven Word Sense Disambiguator," Computer and the Humanities, vol. 34, pp. 121–126, Kluwer Academic Publishers, 2000.

Klavans, Judith, et al. "The Bicord System: Combining Lexical Information from Bilingual Corpora and Machine Readable Dictionaries," Proceedings of the Thirteenth International Conference on Computational Linguistics, Helsinki, Finland; 1990, pp. 174–178.

Richardson, Stephen D. et al. "MindNet: Acquiring and Structuring Semantic Information from Text," Proceedings of COLING/ACL, Montreal, Canada; 1999, pp. 1098–1102.

Segond, Frederique. et al. "All You Can Use! or How to Perform WSD with Available Resources," Second Workshop on Lexical Semantic System, Pisa, Italy.

Segond, Frederique. et al "Dictionary–Driven Semantic Look–Up," Computer and the Humanities, vol. 34, pp. 193–197, 2000.

Wils, Yorick, et al. "Word Sense Disambiguation Using Optimized Combinations of Knowledge Sources," Proceedings of $17^{th}$ International Conference on Computational Linguistics and the $36^{th}$ Annual Meeting of the Association of Computational Linguistics (COLING–ACL '98), Montreal, Canada; 1998, pp. 1398–1402.

Aït–Mokhter, S., Chanod, J.P., "Subject and Object Dependency Extraction Using Finite–State Transducers", in Proceedings of Workshop on Information Extraction and the Building of Lexical Semantic Resources for NLP Applications, ACL, Madrid, Spain, 1997.

Bauer, D. Segond. F., Zaenen, A. "LOCOLEX: The Translation Rolls Off Your Tongue" in ACH–ALLC '95 Conference Abstracts, Santa Barbara, CA Jul. 11–15, 1995, p. 6–9.

* cited by examiner

Primary Examiner—Patrick N. Edouard
(74) Attorney, Agent, or Firm—Oliff & Berridge, PLC

(57) ABSTRACT

In semantically disambiguating words, where more than one disambiguation applies to the context in which a word occurs, a rule can be selected based on the type of information from which it was obtained. The rules can be derived from different types of information in a corpus such as a dictionary, and rules can be selected in accordance with a prioritization of the types of information.

15 Claims, 7 Drawing Sheets

TYPE-BASED SELECTION OF RULES FOR SEMANTICALLY DISAMBIGUATING WORDS

FIELD OF THE INVENTION

The invention relates to techniques that semantically disambiguate words using rules, referred to herein as "semantic disambiguation rules" or simply "disambiguation rules".

BACKGROUND

Segond, F., Aimelet, E., and Jean, C., previously developed semantic dictionary look-up (SDL), a technique that uses dictionary information about subcategorization and collocates to disambiguate word sense. The SDL uses a dictionary, specifically the Oxford University Press-Hachette bilingual French-English, English French dictionary (OUP-H), as a semantically tagged corpus of different languages. SDL selects the most appropriate translation of a word appearing in a given context, and reorders dictionary entries making use of dictionary information.

To extract functional information from input text in order to match against OUP-H information, SDL uses an incremental finite state parser. The parser adds syntactic information in an incremental way, depending on the contextual information available. SDL matches relations extracted by the parser against collocates in the OUP-H, and, if a match is found, SDL reorders the dictionary entry to propose the OUP-H translation that includes the matching collocate rather than the first sense in the OUP-H. In case of information conflict between subcategorization and collocates, SDL gives priority to collocates.

Dini, L., DiTomaso, V., and Segond, F. also previously developed Ginger II, a semantic tagger that performs "all word" unsupervised word sense disambiguation for English. To automatically generate a large, dictionary-specific semantically tagged corpus, Ginger II extracts example phrases found in the text in machine-readable dictionary entries from the HECTOR dictionary described in Atkins, S., "Tools for corpus-aided lexicography: the HECTOR project", *Acta Linguistica Hungarica*, Budapest, Vol. 41, 1992–93, pp. 5–72. Ginger II attaches to each headword in this text the dictionary sense numbering in which the text was found. This provides the sense label for the headword in that context. Ginger II then builds a database of semantic disambiguation rules from this labeled text by extracting functional relations between words in these corpus sentences.

The rules can be on two layers—a word layer and/or an ambiguity class layer. The rules are extracted directly with a nonstatistical approach, using all functional relations that are found. When an example z is listed under the sense number x of a dictionary entry for the word y, Ginger II creates a rule that, in usages similar to z, the word y has the meaning x. A HECTOR sense number is used to represent the headword in a rule based on an example in the dictionary entry for that sense, while WordNet tags are used for other words in the examples. One type of rule indicates, for a specified ambiguity class, that it disambiguates as a specified one of its members when it has a specified functional relation to a specified word. Another type of rule indicates, for a specified ambiguity class, that it disambiguates as a specified one of its members when it has a specified functional relation to a specified ambiguity class.

Ginger II applies the rules to a new input text to obtain as output a semantically tagged text, giving word layer rules priority over class layer rules. If more than one rule from the same layer matches, the applier uses the notion of tagset distance in order to determine the best matching rule. The metric for computing the distance can be set by the user and can vary across applications.

SUMMARY OF THE INVENTION

The invention addresses problems that arise with the previous techniques of Segond et al. and Dini et al., described above.

The SDL technique of Segond et al. uses information from a dictionary to disambiguate word senses, but depends on finding a very precise match between a relation in input text and a collocate in a dictionary example. After obtaining information about a relation from the parser, SDL accesses a dictionary entry for a word in the relation to determine whether a matching collocate occurs in one of the senses in the entry. If a precise match occurs in one of the senses, SDL selects that sense for the word. SDL will not, however, obtain any information from a collocate that does not precisely match the input text relation. This problem, referred to herein as the "precise match problem", reduces the ability of SDL to disambiguate words in contexts that are similar but not identical to collocates.

Ginger II of Dini et al. employs disambiguation rules that include ambiguity classes. Ginger II therefore alleviates the precise match problem, because a rule with an ambiguity class may be applicable when contexts do not precisely match. But because Ginger II can produce a very large number of rules from a detailed dictionary, there are often two or more disambiguation rules at the word layer or at the class layer that match a functional relation in an input text. When this occurs, Ginger II computes a tagset distance to determine the best matching rule. In practice, however, the tagset distance technique sometimes fails to select the best rule, and instead selects a rule that produces incorrect disambiguation. This problem is referred to herein as the "incorrect rule problem", and it is likely to become more serious as more dictionary information is used to produce rules, because more rules will result.

The precise match problem and the incorrect rule problem appear to be in tension: The use of ambiguity classes to alleviate the precise match problem, as in Ginger II, would make the incorrect rule problem worse. On the other hand, limiting the number of possible matches to avoid the incorrect rule problem, as the SDL technique implicitly does, would lead to the precise match problem.

The invention is based on the discovery of techniques that can alleviate both the precise match problem and the incorrect rule problem. The techniques can be used with ambiguity classes, thus alleviating the precise match problem; the techniques also provide flexible ways to select rules, making it possible to alleviate the incorrect rule problem. The techniques, as implemented, employ more dictionary information than Ginger II, thus obtaining more rules, but can nevertheless select rules without difficulty.

The techniques use disambiguation rules derived from different types of information in a corpus, and select one rule rather than another based on the types of corpus information from which the rules are derived. A detailed corpus such as a dictionary typically contains several different types of information, and rules obtained from some types of information are more likely to disambiguate a word correctly than rules obtained from other types. Because of the additional precision implicit in the rule types, the techniques sometimes lead to better rule selection than purely distance-based techniques.

In addition, the rules can include both word-based rules that specify a relation between specified words and class-based rules that specify a relation between a word and a class or between two classes. Where both a word-based rule and a class-based rule match a text, disambiguation can sometimes be improved by selecting the word-based rule rather than the class-based rule. When a text is matched by more than one rule at the same level of specificity, whether word-based or class-based, a rule can be selected based on information type.

Therefore, the invention alleviates the precise match problem by permitting class-based rules and also alleviates the incorrect rule problem by permitting selection of a disambiguation rule based on type of information. Already, the techniques can sometimes obtain better disambiguation results than conventional distance-based selection. Because selection of rules based on information type is more flexible than distance-based selection, the techniques offer the possibility of further improvements in disambiguation results.

The techniques can be implemented in a method that obtains information about a context in which a semantically ambiguous word occurs in an input text. A first rule derived from a first type of information in a corpus and a second rule derived from a second type of information in the corpus are both applicable to words occurring in the context. Based on the types of corpus information from which the rules are derived, the method selects the first rule rather than the second rule to disambiguate the semantically ambiguous word.

As noted above, rules can be derived from different types of information in a dictionary. For example, in one successful implementation, the dictionary includes a set of types of information that includes, from highest to lowest priority, collocates, idioms (using word-based rules only), compounds, structure examples, phrasal verb examples, usage, and general examples. This prioritization is based in part on the observation that selecting collocates over other types of dictionary information produces more reliable results.

Each rule can include a context descriptor specifying contexts in which the rule is applicable. Each context descriptor can include two or more word descriptors and a relation descriptor specifying a type of relation in which words that satisfy the word descriptors can occur.

The method can use the input text to obtain information about a set of relations between the semantically ambiguous word and other words in the input text. For each relation, the method can also obtain information about words that occur in the relation in the input text. The method can then compare a rule's context descriptor with the information about relations and words in the input text. If context descriptors of first and second rules derived from first and second types of corpus information, respectively, are both satisfied by a relation between the semantically ambiguous word and other words in the input text, the method can compare the types of corpus information from which the first and second rules are derived. For example, the method can determine that the first type of corpus information has higher priority than the second type. Based on this determination, the method can then select to disambiguate the semantically ambiguous word using the first rule rather than the second rule.

On the other hand, as between the first rule and a third rule derived from the first type of corpus information, the method can select the first rule on the basis that its context descriptors are more specific than the context descriptors of the third rule. For example, each context descriptor can include two or more word descriptors: Each word descriptor in word-based rules can specify one normalized word form, while each class-based rule can include at least one word descriptor that specifies an ambiguity class of word categories. The first rule can be a word-based rule while the third rule is a class-based rule.

The techniques can also be implemented in a machine that includes an input text, a set of rules, and a processor. The set of rules can include rules derived from two or more types of information in a corpus, with each of the rules derived from at least two of the types of information being applicable to words occurring in specified contexts. In semantically disambiguating words, the processor can obtain information about a context in which a semantically ambiguous word occurs and can select to apply a first rule to the context rather than a second rule based on the types of corpus information from which the rules are derived, as described above in relation to the method.

The techniques can also be implemented in a stored rule set that includes a storage medium and rules data stored by the storage medium. The rules data can be accessible by a processor performing semantic disambiguation. The processor can access the rules data to obtain a set of semantic disambiguation rules derived from information in a corpus that include two or more types of information, such as a dictionary with the types of information listed above. The processor can also access the rules data to obtain, for each of a set of the rules, a type of corpus information from which the rule was derived.

The rules data can include an item of data for each rule in the set. The processor can access each rule's item of data to obtain the type of corpus information from which the rule was derived. The processor can also access each rule's item of data to obtain a type of relationship, a set of descriptors of words to which the relationship can apply, and a disambiguated sense of one of the words to which the relationship can apply. For at least one of the rules in the set, the set of descriptors can include a word and an ambiguity class applicable to another word.

In comparison with the SDL technique of Segond et al., the techniques provided by the invention are advantageous because they can avoid the precise match problem by providing class-based rules that can match any word in an ambiguity class rather than just one of the words.

In comparison with Ginger II of Dini et al., the techniques described by the invention are advantageous because they alleviate the correct rule problem by providing a more flexible approach to selecting one of a number of matching rules. Therefore, the techniques offer the possibility of extracting rules from more of the information contained in dictionary entries, for example, and of selecting from a larger set of matching rules. In addition, where rule selection based on type of corpus information is inapplicable, a simple distance-based selection can be made, thus combining in one strategy both type-based and distance-based rule selection.

The techniques also appear to be general, applicable to any language. The implementations that employ dictionaries appear to be applicable to any language for which a dictionary is available in electronic form. The techniques are especially advantageous, however, where a detailed dictionary is available, with many different types of information. The implementations that employ dictionaries also avoid the data acquisition bottleneck that has been observed for semantic disambiguation techniques. The dictionary implementations also do not require iterative validation, as would be necessary for machine-learning techniques, because conventional dictionaries provide typical usages of each sense.

Similarly, the techniques are generally useful in disambiguating by obtaining a word's meaning. Translation is one application of disambiguation, but the techniques should be useful in many other applications.

The following description, the drawings, and the claims further set forth these and other aspects, objects, features, and advantages of the invention.

DETAILED DESCRIPTION OF THE INVENTION

A. Conceptual Framework

The following conceptual framework is helpful in understanding the broad scope of the invention, and the terms defined below have the indicated meanings throughout this application, including the claims. In addition to the definitions set forth below, the definitions set forth in copending, coassigned U.S. patent application Ser. No. 09/XXX,XXX (Attorney Docket No. D/99452), entitled "Using Ranked Translation Choices to Obtain Sequences Indicating Meanings of Multi-Token Expressions", are incorporated herein by reference.

The "meaning" of an instance of a word refers to its semantic content to humans who understand it.

A "sense" of a word is one of the distinct meanings that instances of the word may have. Some words have many different senses, depending on the contexts in which instances of the words occur.

A "translation" of an instance of a word from a first language is a sequence of one or more words in a second language that has approximately the same meaning to humans who understand the second language as the instance of the word has to humans who understand the first language.

To "semantically disambiguate" or "disambiguate" a word means to reduce ambiguity in the meaning of an instance of the word. For example, if the word has more than one sense in a dictionary, disambiguation could be performed by reducing the number of senses that could apply or by selecting one sense that applies to the instance of the word. Or if the word has more than one translation, disambiguation could reduce the number or select one translation that applies to the instance of the word.

A "rule" is an item of data that indicates a relationship between a context in which the rule applies and a result of applying the rule. A "semantic disambiguation rule" is a rule that applies to a word based on its context and results in disambiguation of the word.

To "select" a rule that is one of a set of rules is to perform an operation that provides the rule as a result.

A "corpus" is a body of text. As used herein, a corpus could include text drawn from more than one source and combined in any appropriate manner.

A "dictionary" is used herein to mean a corpus in which words are associated with descriptions of the words' meanings.

A "type of information" is a category applicable to information. For example, information about a sense of a word in a dictionary can include various types of textual information, such as collocates, idioms, compounds, structure examples, phrasal verb examples, usages, and general examples. Types of information can be logically modified to obtain additional higher-level types, such as by union, intersection, or complement operations.

A rule is "derived from" a type of information in a corpus if the rule was obtained using information of that type from the corpus.

B. General Features

Figure 1:
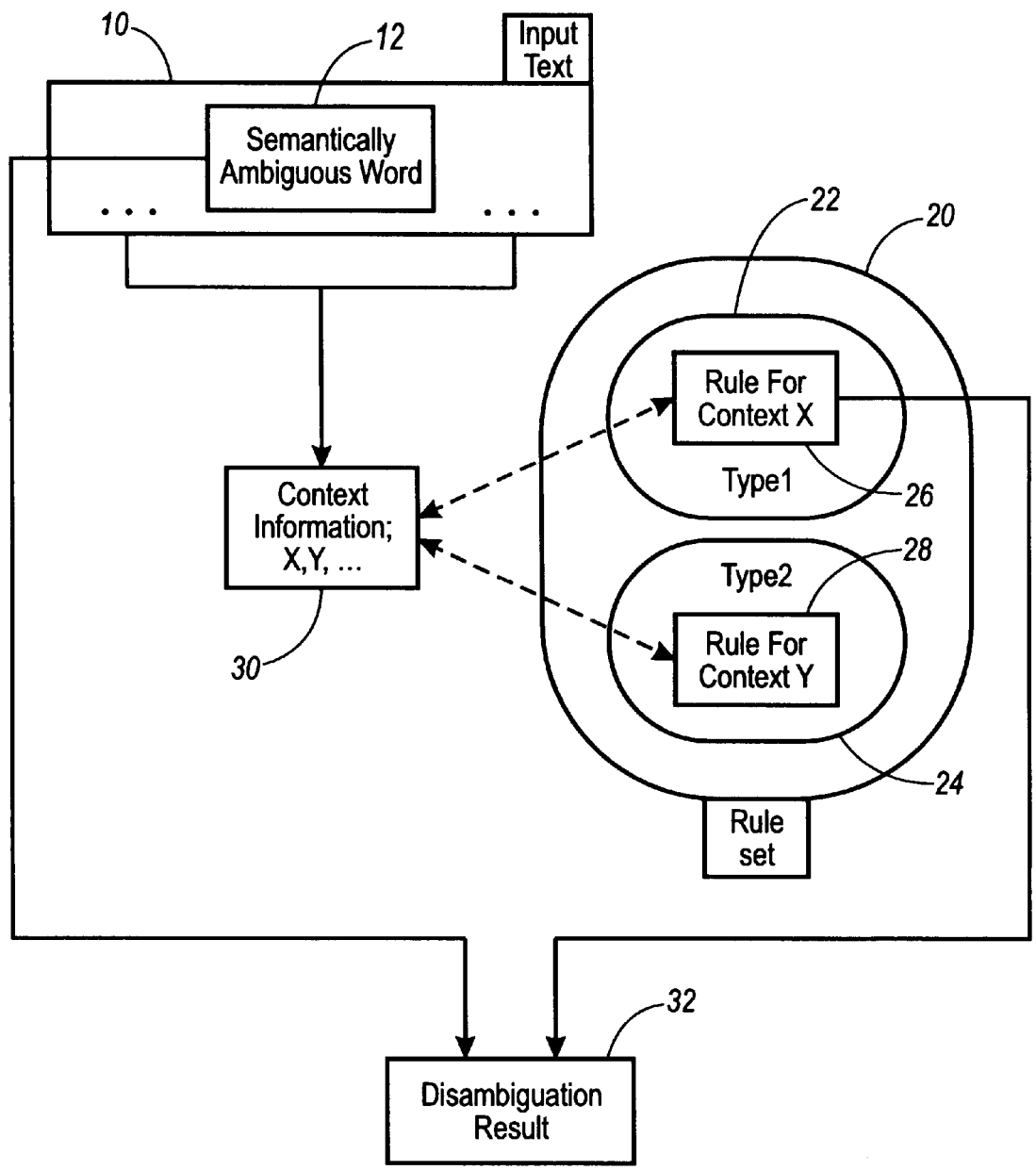
FIG. 1 is a schematic flow diagram showing how a rule can be selected to disambiguate a word based on type corpus information from which the rule was derived.
Figure 2:
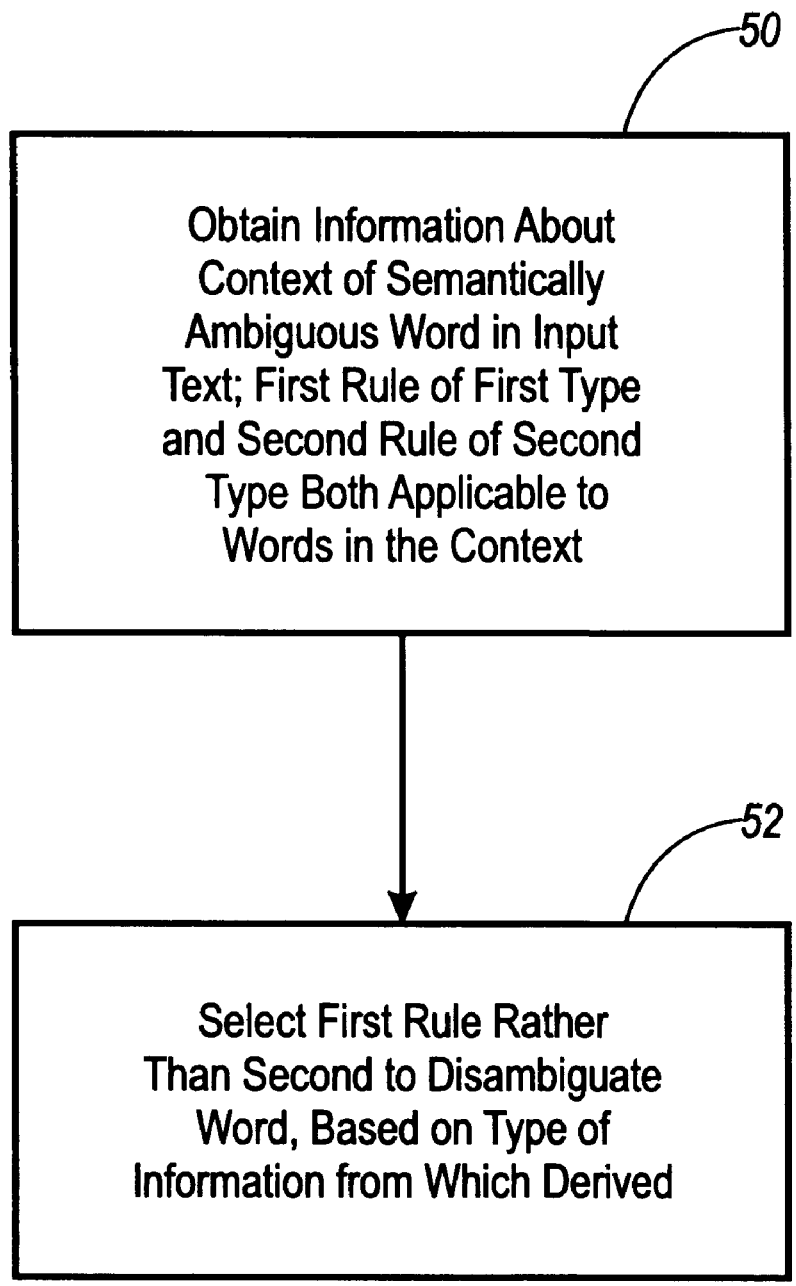
FIG. 2 is a flow chart showing general acts in obtaining context information about a semantically ambiguous word's context and in selecting one of the rules applicable to the context to disambiguate the word based on type of corpus information from which the rule was derived.
Figure 3:
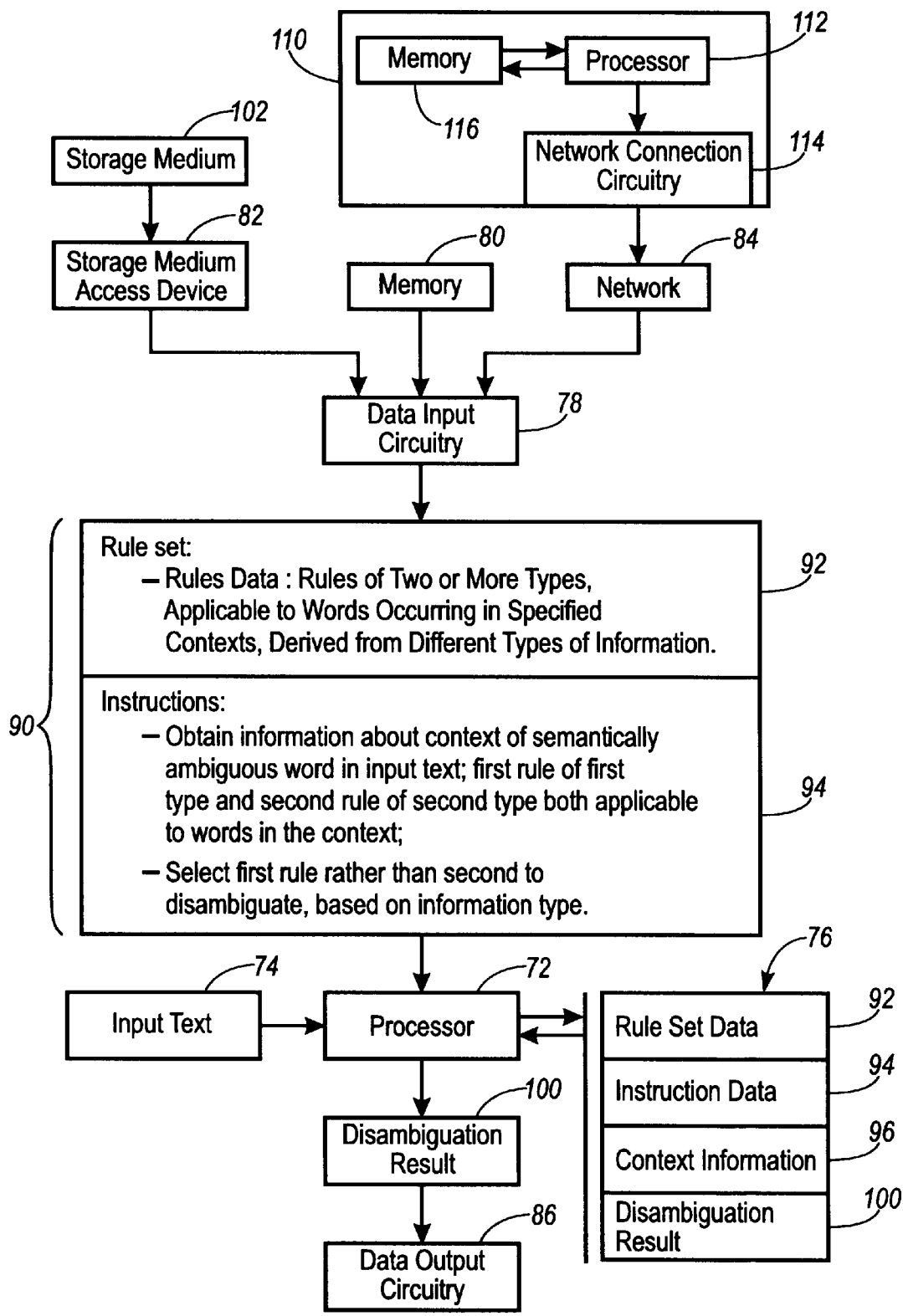
FIG. 3 is a schematic diagram showing components of a system that can perform the general acts in FIG. 2.

FIGS. 1–3 illustrate general features of the invention.

FIG. 1 is a flow diagram that shows schematically how a rule can be selected to disambiguate a word based on rule type.

Input text 10 illustratively includes semantically ambiguous word 12, an instance of a word that has more than one sense. Rule set 20 includes rules derived from two or more types of information in a corpus, with rules derived from information of types 1 and 2 illustratively shown as subsets 22 and 24. Type 1 includes rule 26, a rule that is applicable to words that occur in a context designated "X", while type 2 includes rule 28, applicable to words that occur in context "Y".

As shown in FIG. 1, context information 30 can be obtained, providing information about a context in which word 12 occurs in input text 10. In the illustrated example, the context of word 12 is an instance both of context X and also of context Y, so that both of rules 26 and 28 are applicable, as indicated by the dashed lines between context information 30 and rules 26 and 28.

Rules 26 and 28 may, however, produce different disambiguation results. One way to solve this problem is to select one of the rules applicable to the context of word 12. In the illustrated example, rule 26 has been selected to disambiguate word 12 based on its information type, i.e. it has been chosen because it is derived from corpus information of type 1. Application of rule 26 to word 12 in its context in input text 10 yields disambiguation result 32.

In FIG. 2, the act in box 50 obtains information about a context in which a semantically ambiguous word occurs in an input text. A first rule in a first type and a second rule in a second type are both applicable to words occurring in the context. Therefore, the act in box 52 selects the first rule rather than the second to disambiguate the word, based on the types of corpus information from which the rules are derived.

Machine 70 in FIG. 3 includes processor 72 connected for accessing input text 74 in a first language and also connected for accessing data in memory 76. Processor 72 is also connected for receiving data through data input circuitry 78, which can illustratively provide data received from connections to memory 80, storage medium access device 82, or network 84. Processor 72 therefore could be the central processing unit (CPU) of a personal computer, workstation, or server, or any other processing device with connections as shown.

Input text 74 can take any appropriate form, such as a series of character codes defining a sentence or other multitoken expression. Input text 74 could be obtained from any appropriate source, including user input circuitry (not shown), memory 76, or data input circuitry 78.

Processor 72 can also be connected for providing information through data output circuitry 86, which can be connected to provide data to destinations similar to memory 80, storage medium access device 82, and network 84.

Body of data 90 is illustratively provided by data input circuitry 78, and includes rule set data 92 and instruction data 94, both of which can be stored in memory 76 for use during ambiguation. In executing the instructions indicated by instruction data 94, processor 72 obtains context information 96 about a context in which a semantically ambiguous word occurs in input text 74. The rules from rule set data 92 include a first rule in a first type and a second rule in a second type, and both the first rule and the second rule are applicable to words occurring in the context of the word in input text 74. Then processor 72 selects the first rule rather than the second to disambiguate the word, based on types of corpus information from which the rules are derived. Processor 72 can thus obtain disambiguation result 100, which can be provided to data output circuitry 86.

As noted above, FIG. 3 illustrates three possible sources from which data input circuitry 78 could provide data to processor 72—memory 80, storage medium access device 82, and network 84.

Memory 80 could be any conventional memory within machine 70, including random access memory (RAM) or read-only memory (ROM), or could be a peripheral or remote memory device of any kind.

Storage medium access device 82 could be a drive or other appropriate device or circuitry for accessing storage medium 102, which could, for example, be a magnetic medium such as a set of one or more tapes, diskettes, or floppy disks; an optical medium such as a set of one or more CD-ROMs; or any other appropriate medium for storing data. Storage medium 102 could be a part of machine 70, a part of a server or other peripheral or remote memory device, or a software product. In each of these cases, storage medium 102 is an article of manufacture that can be used in a machine.

Network 84 can provide data from machine 110. Processor 112 in machine 110 can establish a connection with processor 72 over network 84 through network connection circuitry 114 and data input circuitry 78. Either processor could initiate the connection, and the connection could be established by any appropriate protocol. Then processor 112 can access data stored in memory 116 and transfer the data to processor 72 over network 84. Processor 72 can store the data in memory 76 or elsewhere. If the data includes rule set data 92 and instruction data 94, processor 72 can then execute the instructions to perform operations using the rules as described above.

C. Implementations

The general features described above could be implemented in numerous ways on various machines to automatically search text to find character strings that match a list of selected strings. The implementation described below has been implemented on a Sun workstation running under Solaris and executing code compiled from C++ source code.

C.1. Overview

Figure 4:
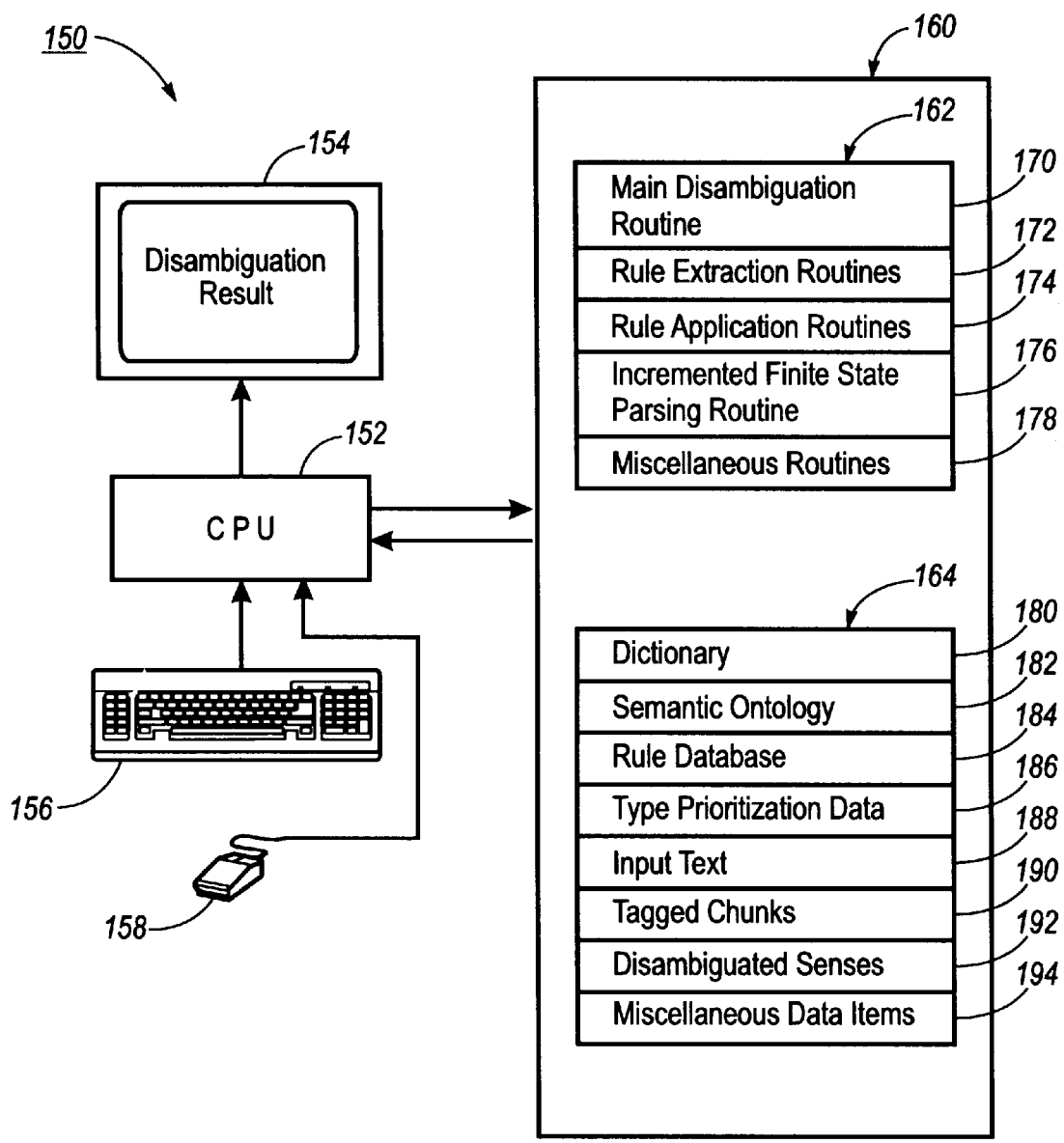
FIG. 4 is a schematic diagram of a system implementing features in FIGS. 2 and 3.

FIG. 4 shows features of an implementation that performs "all word" unsupervised word sense disambiguation, exploiting information of various types from a machine-readable dictionary. The dictionary's entries include general information like collocates, examples of usage, prepositions that may introduce a modifier of a word, and so forth, and, for word's with more than one semantic sense, the information relating to each sense is gathered in the portion of the word's entry for that sense.

The general theory behind the implementation in FIG. 4 is to generate a large, dictionary-specific semantically tagged corpus from information in dictionary entries by extracting text and annotating each headword occurrence in the text with a dictionary sense number of the headword in which the text occurred. The corpus can then be used to build a database of semantic disambiguation rules by extracting functional relations between words.

In FIG. 4, system 150 includes the central processing unit (CPU) 152 of a Sun workstation. CPU 152 is connected to display 154 for presenting images and to keyboard 156 and mouse 158 for providing signals from a user. Display 154 illustratively presents an image of disambiguation results on its screen. CPU 152 is also connected so that it can access memory 160, which can illustratively include program memory 162 and data memory 164.

The routines stored in program memory 160 can be grouped into functions, several of which are illustrated—main disambiguation routine 170, rule extraction routines 172, rule application routines 174, incremental finite state parsing routines 176, and miscellaneous routines 178. A current implementation uses the XeLDA client/server linguistic platform, described in copending, coassigned U.S. patent application Ser. No. 09/221,232, entitled "Executable for Requesting a Linguistic Service", incorporated herein by reference. Incremental finite state parsing routines 176, also referred to as a "shallow parser" because they identify text segments or "chunks" and extract functional dependencies such as subject, object, modifier, etc., are now implemented as a modular XeLDA service. In this implementation, rule extraction routines 172 are implemented as a modular XeLDA client. Rule application routines 174 are similarly implemented as a modular XeLDA service, as a specific kind of bilingual dictionary lookup in which a dictionary entry is reordered in accordance with disambiguation rules, with the translation resulting from a selected rule first in order. In addition to its modular architecture, XeLDA provides rapid execution for parsing and for rule retrieval.

FIG. 4 also shows several items of data stored in data memory 164 and accessed by CPU 152 during execution of routines in program memory 162—dictionary 180, semantic ontology 182, rule database 184, type prioritization data 186, input text 188, tagged chunks 190, disambiguated senses 192, and miscellaneous data items 194, some of which are described below.

Rule extraction routines 172 can be called through a Unix client to produce rule database 184. Then, main disambiguation routine 170 can provide a simple user interface allowing a user to select rule application, in response to which an appropriate call can be made to rule application routines 174.

C.2. Rule Extraction

Figure 5:
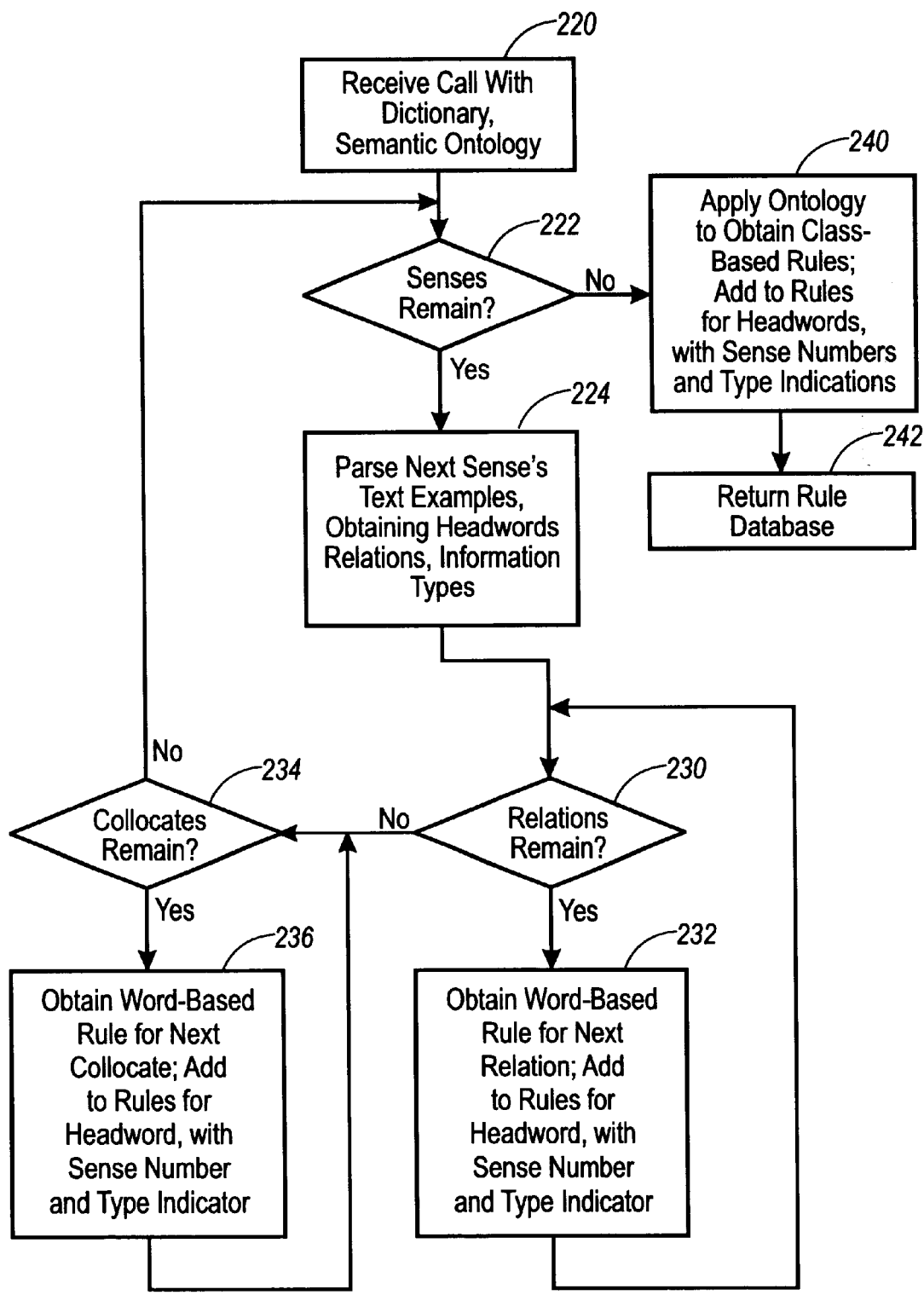
FIG. 5 is a flow chart showing acts performed by the system of FIG. 4 in extracting rules from a dictionary.

FIG. 5 shows general acts that can be performed in response to a call to rule extraction routines 172.

The act in box 220 begins by receiving a call to perform rule extraction. The call includes handles for dictionary 180 and semantic ontology 182. In a current implementation, for example, dictionary 180 is an on-line version of Corréard, M.-H., and Grundy, V., Eds., *The Oxford Hachette French Dictionary*, Oxford University Press-Hachette, 1994 (OUP-H) in which a unique sense number is assigned to each semantic sense in the dictionary entries. Semantic ontology 182 is the top level WordNet 1.6 categories described in Fellbaum, C., *"WordNet: An Electronic Lexical Database*, MIT Press, Cambridge, Mass., 1998, supplemented with information from a general thesaurus to provide semantic categories for adjectives and adverbs and then converted into a finite state transducer to improve performance. The general function of semantic ontology 182 is to classify words according to their semantic classes, and the finite state transducer accordingly can be applied to a word to obtain a descriptor of a semantic ambiguity class that includes the word. But the technique in FIG. 5 is modular, in the sense that it can take any online dictionary as input, whether a monolingual or bilingual dictionary, and can similarly take any kind of semantic ontology.

The act in box 222 begins an outer iterative loop that can handle each sense defined in dictionary 180, though it may be appropriate in some implementations to extract rules only from senses of words with more than one sense. The act in box 224 calls incremental finite state parsing routines 176 to parse text in the definition of the current sense. Routines 176 can be implemented as described in Aït-Mokhtar, S., and Chanod, J.-P., "Subject and Object Dependency Extraction Using Finite-State Transducers", in *Proceedings of Workshop on Information Extraction and the Building of Lexical Semantic Resources for NLP Applications*, ACL, Madrid, Spain, 1997. As explained there, routines 176 perform tokenization, morphological analysis, tagging, chunking, and extraction of functional dependencies or relations between words, and can provide tags indicating types of relations. The key information returned in box 224 includes the functional relations of the current sense's headword, i.e. the word for which the sense is a definition, and, for each functional relation, tags indicating the type of relation and the type of information in which the relation occurs.

The act in box 230 then begins a first inner iterative loop that handles each of the relations from box 224 in turn. The act in box 232 obtains a word-based rule for each relation, which could be paraphrased as follows: If headword occurs in the relation DEP(X, Y), either as word X or as word Y, it can be disambiguated with the current sense's sense number. Thus a word-based rule directly matches the lexical context of the headword. Examples of word-based rules are explained in greater detail below.

Then the act in box 232 adds the rule to a list of rules for the current headword, together with items of data indicating the rule's sense number and indicating the type of information from which the rule is derived.

When all the relations from box 224 have been handled, the act in box 234 begins a second iterative loop that handles each collocate in the current sense. The act in box 236 obtains a word-based rule for the next collocate and, as in box 232, adds the rule to a list of rules for the current headword, together with items of data indicating the rule's sense number and indicating that the rule was derived from a collocate. In order to derive a rule from a collocate in a dictionary like OUP-H in which a collocate includes a tag indicating its functional relation with an entry's headward, it is only necessary to read directly from the tag whether the word functions as subject, object, etc. in the collocate, and an appropriate rule can be written directly.

When all the senses have been handled, the act in box 240 applies semantic ontology 182 to obtain class-based rules based on the word-based rules from boxes 232 and 236. A class-based rule could be paraphrased as follows: If headword occurs in a relation that is an instance either of DEP(X, Class(Y)) where X=headword, or of DEP(Class(X), Y) where Y=headword, it can be disambiguated with the current sense's sense number. A class-based rule can thus be obtained from a word-based rule by applying semantic ontology 182 to the non-headword argument of the rule's relation to obtain a semantic ambiguity class for the non-headword, and by then producing a rule in which the non-headword is replaced by its ambiguity class, such as by an actual list of the members in the class or by an identifier of the class. A class-based rule matches the semantic context of the headword, without necessarily matching its lexical context. Examples of class-based rules are explained in greater detail below.

The current implementation thus uses two distinct sets of semantic tags—sense numbers from dictionary 180 and tags from semantic ontology 182. The number of tags is relatively small to ensure that the class-based rules are sufficiently general to avoid the precise match problem. Using only the dictionary sense numbers would result in far too many class-based rules, each with a very limited range of application.

Each class-based rule is similarly added to the list of rules for the headword of the rule on which it is based, together with items of data indicating the rule's sense number and indicating the type of information from which the rule was derived.

Finally, the act in box 242 returns completed rule database 184, with a list of rules for each of a number of headwords.

C.3. Rule Application

Figure 6:
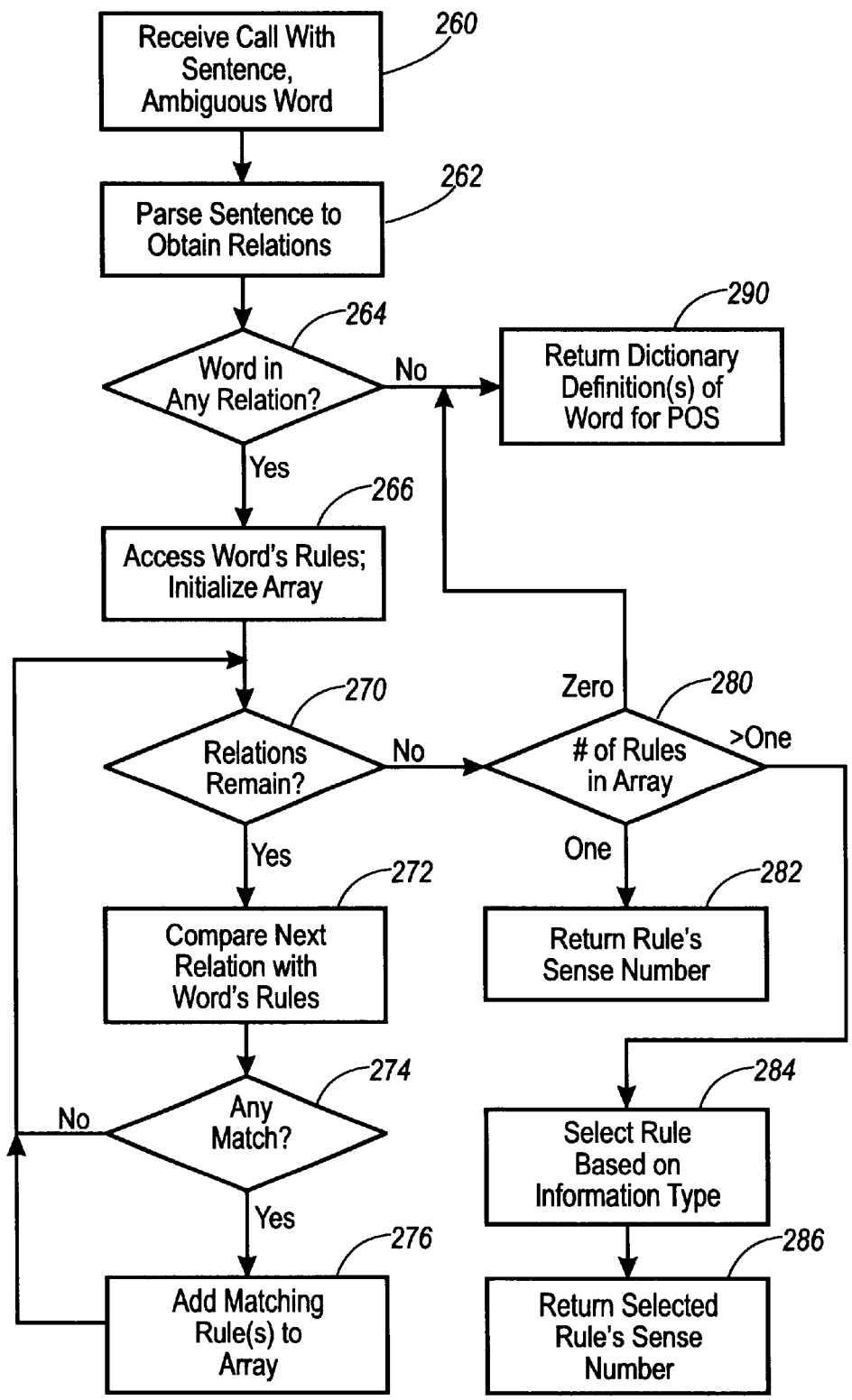
FIG. 6 is a flow chart showing acts performed by the system of FIG. 4 in disambiguating a word.

FIG. 6 shows general acts that can be performed in response to a call to rule application routines 174, to select a best rule to apply to a word in a particular context and to provide the rule's sense number. Rule application routines 174 could be called, for example, from another application in miscellaneous routines 178, such as LOCOLEX, described in Bauer, D., Segond, F., and Zaenen, A., "LOCOLEX: the translation rolls off your tongue", in *ACH-ALLC '95 Conference Abstracts*, Santa Barbara, Calif., Jul. 11–15, 1995, pp. 6–9. LOCOLEX could attempt to obtain a sense for a word and, if unsuccessful, could call rule application routines 174 to obtain a disambiguated sense. In addition to its other lexicons, LOCOLEX can have a lexicon for idioms and compounds, represented by regular expressions; rules are also extracted for idioms and compounds, however, to cover situations where the regular expression encodings are wrong, or are too restrictive or too broad.

The act in box 260 begins by receiving a call to perform rule application. The call includes a relevant portion of input text 188, together with an indication of a word within input text 188 to be disambiguated. The relevant portion of input text 188 could, for example, be the sentence that includes the ambiguous word, as shown.

The act in box 262 calls incremental finite state parsing routines 176 to parse the sentence from box 260, returning tagged chunks 190, with information indicating relations between normalized words that occur in the sentence and, for each relation, tags indicating the type of relation. The act in box 264 tests whether any of the relations obtained in box 262 includes the ambiguous word from box 260.

If the word is in any of the relations, the act in box 266 prepares for an iterative loop to handle each of the relations. The act in box 266 accesses the word's rules from rule database 184, and initializes an array in miscellaneous data items 194 to temporarily hold matching rules. Then the act in box 270 begins the iterative loop.

During each iteration, the act in box 272 begins by comparing the next relation that includes the ambiguous word with the word's rules from database 184. Direct comparisons can be made with word-based rules, while the ambiguity classes of related words must be obtained using semantic ontology 182 before comparing with class-based rules. Two types of matches with class-based rules can occur—full or perfect matches in which a set of classes in the rule is exactly the same as the set of classes for a related word, and partial or imperfect matches in which the set of classes for the related word is a subset of the set of classes in the rule. The test in box 274 determines whether any of the rules match and, if so, all matching rules are added to the array from box 266 before beginning the next iteration in box 270.

When all the relations have been handled, the act in box 280 branches based on the number of rules in the array from box 266. If there is only one rule in the array, that rule's sense number is returned in box 282 as the disambiguated sense of the word from box 260. But if there is more than one rule, the act in box 284 selects one of the rules based on information types and the act in box 286 returns the sense number of the selected rule as the disambiguated sense.

If the array is empty or if the test in box 264 determined that the ambiguous word was not in any of the relations, the act in box 290 returns the dictionary definitions of the word for the part of speech (POS) obtained in box 262.

Figure 7:
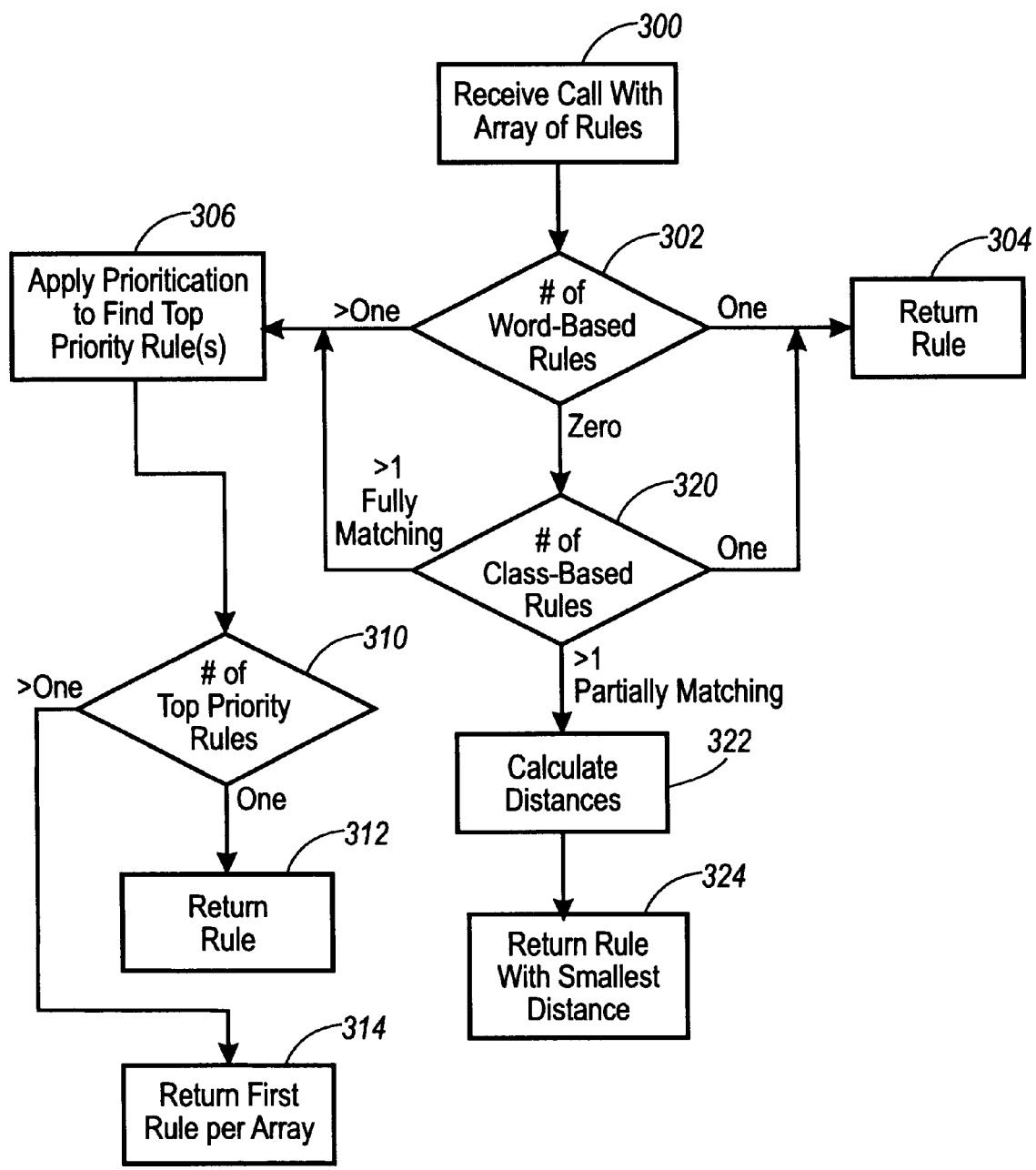
FIG. 7 is a flow chart in greater detail how a rule can be selected based on information type in box 284 in FIG. 6.

FIG. 7 illustrates acts in selecting a rule based on information types in box 284 in FIG. 6.

The act in box 300 begins by receiving a call with an array of rules, from which one rule must be selected. The act in box 302 then branches based on the number of word-based rules in the array, which can be determined from the internal structure of the rules.

If there is only one word-based rule, the act in box 304 returns that rule as the selected rule. But if there are more than one word-based rule, the act in box 306 accesses type prioritization data 186 to find the rules from the information type with highest priority. As noted above, the prioritization for word-based rules can be as follows, from highest to lowest: collocates, idioms, compounds, structure examples, phrasal verb examples, usages, and general examples, partly on the basis that selecting rules based on collocates rather than other types of dictionary information produces more reliable results. In general, however, any prioritization could be used that produces satisfactory results.

The act in box 310 branches based on the number of top priority rules. If there is only one, the act in box 312 returns that rule as the selected rule, but if there are more than one, the act in box 314 returns the first rule in the order in which the rules were added to the array.

If there are no word-based rules, the act in box 320 similarly branches based on the number of class-based rules, which can again be determined from the internal structure of the rules. If one, it is returned in box 304. If more than one fully matching class-based rules, the acts in boxes 306 through 314 are performed, as described above, to return a selected rule. As noted above, the prioritization for class-based rules can be as follows, from highest to lowest: collocates, compounds, structure examples, phrasal verb examples, usages, and general examples.

Finally, if there are no word-based rules and no fully matching class-based rules, there should be at least two partially matching class-based rules in the array. Therefore, the act in box 322 performs conventional operations to obtain, for each rule in the array, a distance between the list (L1) of classes of the rule and the list (L2) of classes associated with the word in the relation that is not the ambiguous word from box 360. The distance can, for example, be a ratio whose numerator is the difference obtained by subtracting the number of classes in the intersection of L1 and L2 from the number of classes in the union of L1 and L2, and whose denominator is the number of classes in the union of L1 and L2; this calculation provides a distance within the range from 0 to 1, with 0 meaning a full match and 1 meaning no match at all. Then, the act in box 324 returns the rule with the smallest distance.

The act in box 324 could also apply a threshold distance above which no rule would be returned, and the threshold could be adjusted to find a critical distance value to optimize results.

C.4. Examples

Rule extraction and rule application are both illustrated by the following examples, which involve disambiguation of the English word "employ".

The OUP-H entry for "employ" as two syntactic senses, one for the POS noun (N), and the other for transitive verb (VTR). The noun has only one semantic sense, while the verb has two, one for the general sense that translates into the French word "employer" and the other for the sense that is almost synonymous with the English word "use". Therefore, three sense numbers can be assigned to "employ", which can be represented by N1, VTR1, and VTR2.

The information for N1 includes the following: "the firm has 40 workers in its ~ . . . , in his ~ . . . "

The information for VTR1 includes: "[person, company]; to ~sb as . . . [driver, accountant etc.], she is ~ed as a secretary . . . ;"

The information for VTR2 includes: "(use) . . . [machine, tool]; . . . [method, practice, strategy, tactics, technique], . . . [measures]; . . . [expression, term, metaphor]; to be ~ed in doing (busy); . . . ; her talents/skills would be better ~ed in advertising . . ."

Each collocate, e.g. "[person, . . . ]" for VTR1, would be tagged in the OUP-H with SGML tags indicating its functional relation to the headword, in this case "<co>person</co>", with "co" indicating that th e word "person" is an object collocate of "employ".

Rule extraction routines 172 can extract word-based and class-based rules in which the left side encodes a functional dependency between the headword, "employ", and its arguments, as described above. The right side of each rule provides the sense number resulting from application of the rule during disambiguation when the rule matches the context of an occurrence of the headword.

The following is a set of rules that could be extracted in this way:

VMODOBJ(have,in,employ)→employ.N1 (ex_example)

VMODOBJ(40|42|39|30|34|41|36|29|32|35,in,employ)→employ.N1 (ex_example)

NNPREP(worker,in,employ)→employ.N1 (ex_$example$)

NNPREP(18|5,in,employ)→employ.N1 (ex_$example$)

DOBJ(employ,person)→employ.VTR1 (collocate)

DOBJ(employ,18|3|8|10)→employ.VTR1 (collocate)

DOBJ(employ,company)→employ.VTR1 (collocate)

DOBJ(employ,14|26|18)→employ.VTR1 (collocate)

DOBJ(employ,driver)→employ.VTR1 (collocate)

DOBJ(employ,18|10|6)→employ.VTR1 (collocate)

SUBJPASS(she,employ)→employ.VTR1 (ex_example)
SUBJPASS(18,employ)→employ.VTR1 (ex_*example*)
DOBJ(employ,machine)→employ.VTR2 (collocate)
DOBJ(employ,6|14|18)→employ.VTR2 (collocate)
DOBJ(employ,tool)→employ.VTR2 (collocate)
DOBJ(employ,6|4|18|8)→employ.VTR2 (collocate)
DOBJ(employ,method)→employ.VTR2 (collocate)
DOBJ(employ,9|7)→employ.VTR2 (collocate)
DOBJ(employ,practice)→employ.VTR2 (collocate)
DOBJ(employ,4|9)→employ.VTR2 (collocate)
DOBJ(employ,strategy)→employ.VTR2 (collocate)
DOBJ(employ,9)→employ.VTR2 (collocate)
DOBJ(employ,tactics)→-employ.VTR2 (collocate)
DOBJ(employ,9)→employ.VTR2 (collocate)
DOBJ(employ,technique)→employ.VTR2 (collocate)
DOBJ(employ,9)→employ.VTR2 (collocate)
DOBJ(employ,measure)→employ.VTR2 (collocate)
DOBJ(employ,7|4|3|10|6)→employ.VTR2 (collocate)
DOBJ(employ,expression)→employ.VTR2 (collocate)
DOBJ(employ,7|10)→employ.VTR2 (collocate)
DOBJ(employ,term)→employ.VTR2 (collocate)
DOBJ(employ,10|28|9)→employ.VTR2 (collocate)
DOBJ(employ,metaphor)→employ.VTR2 (collocate)
DOBJ(employ,10)→employ.VTR2 (collocate)

Rule application routines 174 could then apply this set of rules to disambiguate "employ" in the following texts: (1) They employ persons under labour contracts in posts which in the budget are earmarked for officials. (2) They employ the slogans of class dictatorship, chauvinism and imperial ambitions to try to win next spring's elections in the Russian federation.

IFSP routines 176 would extract two dependencies from text (1): SUBJ(they,employ); and DOBJ(employ,person). The second of these directly matches the word-based rule:

DOBJ(employ,person)→employ.VTR1 (collocate)

Therefore, sense number VTR1 is returned. Since the dictionary is bilingual, this sense number corresponds to the translation "employer" in French.

IFSP routines 176 would similarly extract two dependencies from text (2): SUBJ(they,employ); and DOBJ(employ,slogan). Neither of these directly matches any of the word-based rules. Therefore, semantic ontology 182 can be applied to the non-headword of each relation to obtain ambiguity classes, resulting in two different relations: SUBJ (3,employ); and DOBJ(employ,10). The second of these matches the following class-based rules:

DOBJ(employ,18|3|8|10)→employ.VTR1 (collocate)
DOBJ(employ,18|10|6)→employ.VTR1 (collocate)
DOBJ(employ,7|4|3|10|6)→employ.VTR2 (collocate)
DOBJ(employ,7|10)→employ.VTR2 (collocate)
DOBJ(employ,10|28|9)→employ.VTR2 (collocate)
DOBJ(employ,10)→employ.VTR2 (collocate)

The last of these rules matches the full set of classes, so that the sense number VTR2 is returned. The possible translations are "utiliser" and "employer" in French.

Suppose the following rules had been matched:

DOBJ(employ,18|10|6)→employ.VTR1 (collocate)
SUBJPASS(18,employ)→employ.VTR1 (ex_example)

In this case, the first rule would have been chosen rather than the second, based on the priority of collocates over examples.

C.5. Variations

The implementation described above could be varied in many ways within the scope of the invention.

The implementation described above has been successfully executed on Sun workstations, but implementations could be executed on other machines.

The implementation described above has been successfully executed using source code written in C++ on the Solaris platform, but other programming environments and platforms could be used.

The implementation described above operates on words in English using rules derived from the OUP-H dictionary with many types of information. The invention could, however, be implemented to operate on words in any language for which an appropriate corpus is available, whether a monolingual or multilingual dictionary, a general corpus that is semantically tagged, or even another semantically tagged corpus. For example, dictionaries with less detail than the OUP-H dictionary could be used.

The implementation described above employs a list of rules extracted from a corpus in advance and that indicate the contexts in which they apply and the disambiguation results they provide in particular ways, with each rule having a single context and a single disambiguation result. Rules could, however, be extracted from a corpus only when needed and could take any appropriate form that makes it possible to determine the contexts to which they apply and to obtain disambiguation results from them. The above rules generally specify contexts as relations involving two or three words, but relations involving larger number of words could be specified. The above rules are either word-based rules, in which each word descriptor specifies one normalized word, or class-based rules, each including at least one non-headword word descriptor that specifies an ambiguity class, but class-based rules with additional ambiguity classes might be used. In addition, each rule could include additional information, such as a tag indicating a type of information from which the rule is derived, and so forth. Rules could be sorted or stored in various ways to facilitate access and comparison with relations extracted from input text, such as by sorting rules by dependency types, and so forth. Furthermore, the rule database could take the form of a finite state data structure.

The implementation described above obtains context information in the form of functional dependencies, using incremental finite state, or shallow, parsing. Context information of various other types could, however, be obtained, such as agent, patient, or anaphoric pronoun relations. Also various other techniques could be used to obtain context information, such as a statistical parser or other robust parser.

The implementation described above selects a rule based on a prioritization of specific types of dictionary information from which rules can be derived, but selection could be performed in ways other than based on a prioritization, especially where types have been obtained by logical operations on simpler types. Also, different prioritizations of types of dictionary information could be used; for example, if a simpler, more coarse-grained dictionary is used, collocates could be given priority over all other examples. Other types of information from a dictionary or other corpus could form the basis for rules, and hence for types of rules. For example, it may be possible to derive rules from dictionary definitions themselves, such as by creating links between words to obtain a semantic network from which rules could be produced.

The implementation described above uses the disambiguation result to obtain translations, but the result of disambiguation could be used in many other ways, including selecting a definition from a dictionary.

In the examples set forth above, rules are shown with a tag indicating the type of information from which each rule is derived, but types of information from which rules are derived could be indicated in various other ways, such as by sorting rules by type of information from which they are derived or storing them so that they can be accessed by type of information from which they are derived.

In the implementation described above, specific acts are performed that could be omitted or performed differently. For example, rather than selecting one rule from all the matching rules based on information type, the disambiguation results could first be compared to determine whether they differ, and a selection could then be made only if different disambiguation results occur.

In the implementation described above, acts are performed in an order that could be modified in many cases. For example, a rule could be selected by matching the rules against relations in the order of the priorities, rather than by first matching the rules, then applying the priorities.

The implementations described above use currently available computing techniques, but could readily be modified to use newly discovered computing techniques as they become available.

D. Applications

Semantic disambiguation is both difficult and important to the quality of many applications. It is potentially useful in all applications where accessing meanings for words is required.

It can be used in all kinds of translation systems—translation aids, full translation systems, etc.—for all kinds of electronic documents—mail, Web documents, teletext, e-mail—and in all kinds of comprehension assistants. The techniques described above are being used, for example, in the glossing application described in copending, coassigned U.S. patent application Ser. No. 09/401,682 (Attorney Docket No. D/99452), entitled "Using Ranked Translation Choices to Obtain Sequences Indicating Meaning of Multi-Token Expressions", incorporated herein by reference.

Furthermore, semantic disambiguation can improve results in information retrieval, such as semantic information attached to queries, in authoring aids such as spell checkers, and in optical character recognition (OCR). Semantic disambiguation can help in improving retrieval, translation, and linking of documents.

At the document level, XML encoding of semantic disambiguation results will allow fast and easy extraction of information and, as a consequence, more efficient knowledge acquisition and management. Further, effective semantic disambiguation will facilitate Web navigation through hyperlinks.

A rule database by itself could be used in other applications, such as to relate together semantically similar words and perform terminology extraction.

Semantic rules can also be used in automatic generation, such as in machine translation, to help select a desired word in a context of generation, such as generating collocates.

E. Miscellaneous

The invention has been described in relation to software implementations, but the invention might be implemented with specialized hardware.

The invention has been described in relation to implementations using serial processing techniques. The invention might also be implemented with parallel processing techniques.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed is:

1. A method of semantically disambiguating words using rules, the rules including rules derived from two or more types of information in a corpus, rules derived from at least two of the types being applicable to words occurring in specified contexts;

the method comprising:
(A) obtaining context information about a context in which a semantically ambiguous word occurs in an input text; a first rule derived from a first type of corpus information and a second rule derived from a second type of corpus information both being applicable to words occurring in the context; and
(B) selecting the first rule rather than the second rule to disambiguate the semantically ambiguous word according to a selection order based on the types of corpus information from which the rules are derived.

2. The method of claim 1 in which each of the rules in the first and second types includes a context descriptor specifying contexts in which the rule is applicable.

3. The method of claim 2 in which each context descriptor includes two or more word descriptors; each word descriptor in the first and second rules specifying one normalized word form.

4. The method of claim 2 in which each context descriptor includes two or more word descriptors; the word descriptors in each of the first and second rules including a word descriptor that specifies an ambiguity class of word categories.

5. A method of semantically disambiguating words using rules, the rules including rules derived from two or more types of information in a corpus, rules derived from at least two of the types being applicable to words occurring in specified contexts, each of the rules in first and second types includes a context descriptor specifying contexts in which the rule is applicable, each context descriptor includes two or more word descriptors and a relation descriptor specifying a type of relation in which words that satisfy the word descriptors can occur;

the method comprising:
(A) using the input text to obtain relation information about a set of relations between the semantically ambiguous word and other words in the input text and, for each relation, word information about words that occur in the relation in the input text; the context information including the relation information and the word information; and
(B) for each of the rules comparing the rule's context descriptor with the context information and obtaining match information indicating that the context descriptors of the first and second rules are both satisfied by a relation between the semantically ambiguous word and other words in the input text;
in response to the match information, comparing the types of corpus information from which the first and second rules were derived and determining that the first type of corpus information has higher priority than the second type of corpus information; and
selecting to disambiguate the semantically ambiguous word using the first rule rather than the second rule based on the determination that the first type of corpus information has higher priority.

6. The method of claim 5 in which the corpus is a dictionary, the dictionary including a set of types of information that include the first and second types of corpus information; the types in the set including, from highest to lowest priority, collocates, idioms, compounds, structure examples, phrasal verb examples, usages, and general examples.

7. A method of semantically disambiguating words using rules, the rules including rules derived from two or more types of information in a corpus, rules derived from at least two of the types being applicable to words occurring in specified contexts, each of the rules in first and second types includes a context descriptor specifying contexts in which the rule is applicable, each context descriptor includes two or more word descriptors and a relation descriptor specifying a type of relation in which words that satisfy the word descriptors can occur;

the method comprising:
- (A) using the input text to obtain relation information about a set of relations between the semantically ambiguous word and other words in the input text and, for each relation, word information about words that occur in the relation in the input text; the context information including relation information and the word information; and
- (B) for each of the rules, comparing the rule's context descriptor with the context information and obtaining match information indicating that the context descriptors of the first and second rules and a third rule are all satisfied by a relation between the semantically ambiguous word and other words in the input text; the third rule also being derived from the first type of corpus information; and in response to the match information, comparing the word descriptors of the first and third rules and determining that the first rule's word descriptors are more specific than the third rule's word descriptors; and selecting to disambiguate the semantically ambiguous word using the first rule rather than the third rule based on the determination that the first rule's word descriptor are more specific.

8. A machine for semantically disambiguating words; the machine comprising:
- an input text;
- a set of rules for use in semantically disambiguating words, the set of rules including rules derived from two or more types of information in a corpus, each of the rules derived from at least two of the types of corpus information being applicable to words occurring in specified context; and
- a processor connected for accessing the input text and the set of rules; the processor, in using the set of rules to disambiguate words in the input text, operating to:
  obtain context information about the context in which a semantically ambiguous word occurs in the input text; a first rule derived from a first type of corpus information and a second rule derived from a second type of corpus information both being applicable to words occurring in context; and
  select the first rule rather than the second rule to disambiguate the semantically ambiguous word according to a selection order based on the types of corpus information from which the rules are derived.

9. A stored rule set for use by a processor in semantically disambiguating words in text; the stored rule set comprising:

- a storage medium; and
- rules data stored by the storage medium; the rules data being accessible by the processor to obtain a set of semantic disambiguation rules derived from information in a corpus, the rules being useable by the processor in disambiguating a semantically ambiguous word that occurs in a context in an input text; the corpus including two or more types of information, rules derived from at least first and second types of corpus information being applicable to words occurring in specified contexts, a first rule derived from the first type of corpus information and a second rule derived from the second type of corpus information both being applicable to words occurring in the context in which the semantically ambiguous word occurs in the input text; the rules data further being accessible by the processor to obtain, for each of a set of the rules, a type of corpus information from which the rule was derived, for use in selecting the first rule rather than the second rule to disambiguate the semantically ambiguous word according to a selection order based on the types of corpus information from which the rules are derived.

10. The stored rule set of claim 9 in which the rules data include an item of data for each rule in the set; each rule's item of data being accessible by the processor to obtain the type of corpus information from which the rule was derived.

11. The stored rule set of claim 10 in which each rule's item of data can further be accessed by the processor to obtain a type of relationship, a set of descriptors of words to which the relationship can apply, and a disambiguated sense of one of the words to which the relationship can apply.

12. The stored rule set of claim 11 in which, for at least one of the rules in the set, the set of descriptors includes a word and an ambiguity class applicable to another word.

13. The stored rule set of claim 9 in which the corpus is a dictionary and the types of corpus information include two or more of collocates, idioms, compounds, structure examples, phrasal verb examples, usages, and general examples.

14. A method of operating a first machine to transfer data to a second machine over a network, the second machine including a memory, an input text, and a processor connected for accessing the memory and for accessing the input text; the method comprising:

establishing a connection between the first and second machines over the network; and operating the first machine to transfer rules data to the memory of the second machine;

the rules data being accessible by the processor to obtain a set of semantic disambiguation rules derived from information in a corpus, the rules being useable by the processor in disambiguating a semantically ambiguous word that occurs in a context in the input text; the corpus including two or more types of information, rules derived from at least first and second types of corpus information being applicable to words occurring in specified contexts, a first rule derived from the first type of corpus information and a second rule derived from the second type of corpus information both being applicable to words occurring in the context in which the semantically ambiguous words occurs in the input text; the rules data further being accessible by the processor to obtain, for each of a set of rules, a type of corpus information from which the rule was derived, for use in selecting the first rule rather than the second rule to disambiguate the semantically ambiguous word according to a selection order based on the types of corpus information from which the rules are derived.

15. A method of semantically disambiguating words using rules, the rules including rules derived from two or more types of information in a corpus, rules derived from at least two of the types being applicable to words occurring in specified contexts;

the method comprising:

(A) obtaining context information about a context in which a semantically ambiguous word occurs in an input text; a first rule derived from a first type of corpus information and a second rule derived from a second type of corpus information both being applicable to words occurring in the context; and (B) first selecting the first rule rather than the second rule to disambiguate the semantically ambiguous word according to a selection order based on the types of corpus information from which the rules are derived, but where the first selecting of the first rule according to a selection order based on the types of corpus information is not applicable for selection, then second selecting the first rule rather than the second rule to disambiguate the semantically ambiguous word according to a distance-based selection rule for selection.

* * * * *